United States Patent [19]

Christenson

[11] Patent Number: 4,812,044
[45] Date of Patent: Mar. 14, 1989

[54] TAG AXLE ASSEMBLY WITH LIMIT SWITCH

[75] Inventor: Ronald E. Christenson, Mantorville, Minn.

[73] Assignee: McNeilus Truck and Manufacturing, Inc., Dodge Center, Minn.

[21] Appl. No.: 177,321

[22] Filed: Apr. 4, 1988

[51] Int. Cl.⁴ .................. B28C 5/26; B62D 61/10; B62D 61/12
[52] U.S. Cl. .................. 366/54; 180/24.02; 180/209; 280/43.23; 280/767; 280/81.1; 366/68
[58] Field of Search .......... 366/44, 54, 55, 56, 366/57, 58, 59, 60, 61, 62, 63, 64, 68; 280/43.23, 43.17, 767, 405 R, 405 A, 405 B, 81 R, 81 A, 81 B, 81.5; 180/24.02, 209, 22

[56] References Cited

U.S. PATENT DOCUMENTS 2,612,250 9/1952 Sarosdy .................. 366/60 X

Primary Examiner—Harvey C. Hornsby
Assistant Examiner—Scott J. Haugland
Attorney, Agent, or Firm—Orrin M. Haugen; Thomas J. Nikolai; Frederick W. Niebuhr

[57] ABSTRACT

A concrete mixing vehicle having a retractable tag axle assembly and a distribution chute is disclosed. To ensure that the tag axle assembly does not come into contact with the distribution chute as the tag axle assembly as it moves between a first ground engaging position and a second elevated position, a limit switch is provided in the control circuit for the tag axle assembly. The limit switch only permits movement of the tag axle assembly when the distribution chute is outside of the tag axle assembly's path of travel as it moves between said first and second positions.

5 Claims, 2 Drawing Sheets

TAG AXLE ASSEMBLY WITH LIMIT SWITCH

The present invention relates to an improved design for a pivotal tag axle assembly used in conjunction with a concrete mixing truck. These improvements permit (1) the collector and folding distribution chutes used to unload concrete from the truck to be stationarily attached to the truck, (2) the point about which the tag axle assembly pivots with respect to the frame to be positioned lower and further rearward, thus permitting the truck to carry greater loads without violating federal weight restrictions, and (3) the tag axle assembly to be raised from its ground engaging position to its elevated position and vise-versa while the distribution chute is extended.

BACKGROUND OF THE INVENTION

The prior art includes many patents disclosing retractable tag axle assemblies for concrete mixing trucks. When the tag axle assemblies are in their lowered road engaging position, the truck is able to carry larger weights yet still meet federal road restrictions. The tag axle assemblies are made retractable so that they do not interfere with off-road travel at the job site or with the discharge of concrete from the truck.

A real problem with many prior art designs is that, as the tag axle assembly is raised or lowered, it will bind with the truck's collector chute or distribution chute. To avoid this problem, some prior art designs have required the chutes to be removed or partially removed from the truck during extension or retraction of the tag axle assembly. In other designs (such as those described in U.S. Pat. No. 3,112,100 to E. S. Prichard and U.S. Pat. No. 3,877,715 to Thayer, et al), the chutes are secured to the tag axle assembly itself rather than directly to the drum supporting pedestal of the concrete mixing truck. These designs suffer from the inability to maintain the close tolerances necessary to avoid unnecessary waste and spillage of concrete.

A rather unique chute arrangement is disclosed in expired U.S. Pat. No. 3,317,193 to Buelow, et al. This patent discloses a concrete mixing truck having a tag axle assembly. The truck also includes a pivoting discharge chute mounted to and supported by a pedestal via a linkage assembly. While the discharge chutes are supported by the truck pedestal rather than by the tag axle assembly, the Buelow design suffers from several problems. For example, the pivot for the tag axle assembly is more forward and higher than is necessary. As such, the design does not provide full advantage with respect to weight restrictions. More importantly, Buelow includes no reliable means for ensuring that the tag axle assembly will not interfere with, damage or be damaged by the concrete discharge chute as the tag axle assembly is raised or lowered.

Thus, there is a real need for a tag axle assembly/cement truck design: (1) which takes full advantage with respect to weight restrictions so that increased payloads can be hauled over the highways without violating government imposed road restrictions; (2) in which the discharge chute(s) are securely attached to the drum pedestal within close tolerances to the discharge opening to avoid unnecessary spillage of concrete; and (3) which includes the provision of reliable means for precluding the raising or lowering of the tag axle assembly unless the chutes are in a position in which they will not contact the tag axle assembly.

SUMMARY OF THE INVENTION

The present invention relates to an over-the-road vehicle which includes a primary frame supported above a plurality of wheels, a rotatable mixing drum supported above the frame, chute means for controlling and directing concrete as it is discharged from the mixing drum, a tag axle assembly mounted to the frame, means for moving the tag axle assembly between a ground engaging position and retracted position, and means for precluding movement of the tag axle assembly unless the chute is positioned so that it will not come into contact with the tag axle assembly.

To maximize the amount of concrete the truck can legally and safely carry, the point on the frame about which the tag axle assembly is pivotally mounted to the frame is as low and rearward as is conveniently possible. To emnsure that the tag axle assembly and chute assembly do not become damaged due to contact while the tag axle assembly is raised or lowered, the design includes a limit switch associated with the chute means. This switch will only be closed, thus permitting the raising or lowering of the tag axle assembly, when the chute is located outside of the travel path of various parts of the tag axle assembly.

OBJECTS OF THE INVENTION

A primary object of the present invention is to provide a truck for hauling concrete with a tag axle assembly which permits greater amounts of concrete to be hauled without violation of governmental load limits.

Another object of the invention is to provide such a vehicle which further includes a stationary collecting chute and a positionable distributing chute(s) which is secured to a stationary pedestal which, in turn, is rigidly secured to the vehicle frame.

Still another object of the invention is to provide means for ensuring that the tag axle assembly does not come into contact with the distributing chute(s) as the tag axle assembly is raised and lowered.

These and other objects will become more readily apparent from a reading of the subsequent Detailed Description of the Invention and the appended claims in view of the drawings in which corresponding parts are identified with corresponding numbers in the several views.

DETAILED DESCRIPTION OF THE INVENTION

Figure 1:
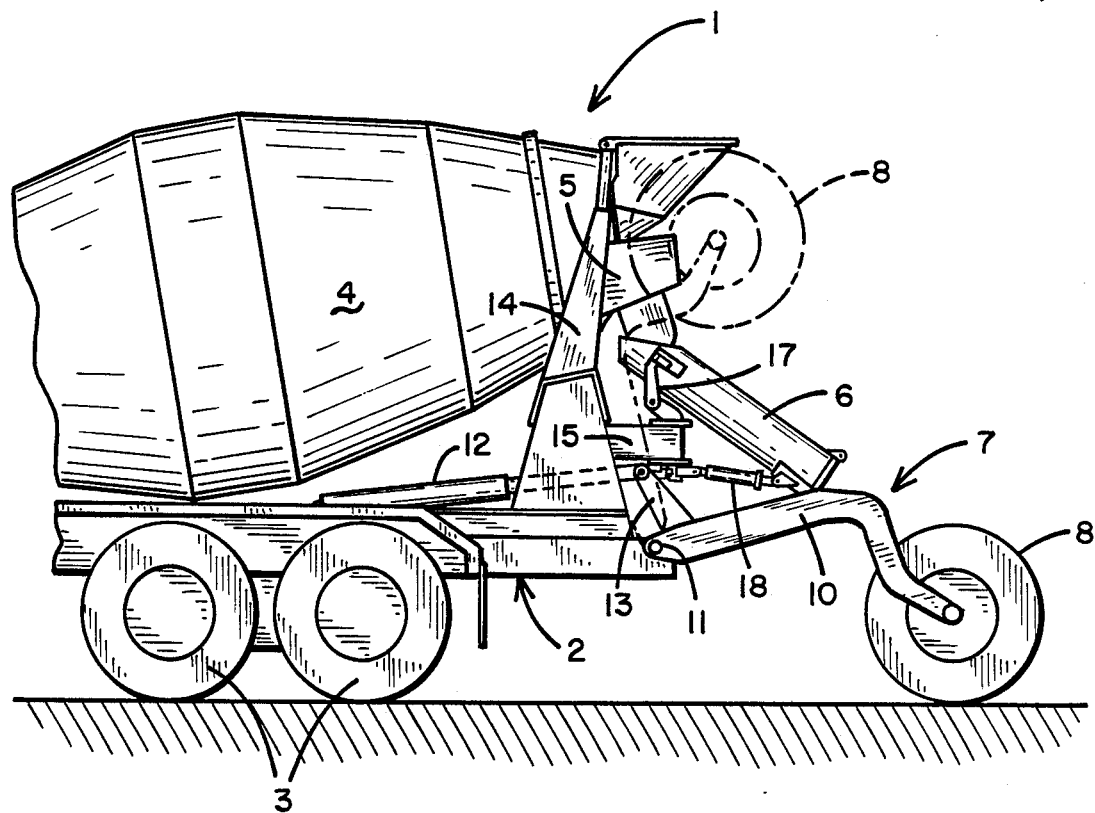
FIG. 1 is a side view showing the rear portion of the vehicle, the discharge chute assembly and the tag axle assembly.

As most clearly shown in FIG. 1, the present invention comprises a truck indicated generally by numeral 1 having a longitudinally extending frame 2 which is supported by a plurality of axles on which wheels 3 are mounted. The frame, in turn, rotatably supports a concrete mixing drum 4, a charge hopper, a collector chute 5 and a foldable distribution chute 6. The chute 6 may be of the type described in my earlier U.S. patent application Ser. No. 070,331 filed July 6, 1987.

Also associated with and pivotally attached to the frame 2 is a tag axle assembly 7. The tag axle assembly 7 is comprised of a pair of arms 10, one on each side of the frame and each of which carries and supports a wheel 8. Each of the arms 10 is journaled for rotation about pivot pin 11 upon actuation of a hydraulic or pneumatic ram or actuator such as 12. The ram 12 is connected at one of its ends to the frame 2 and at its other end to the tag axle assembly via a horn 13. Horn 13 projects upwardly from a cross member (not shown) which runs between the two arms 10. This cross member maintains the correct spacing between the arms 10 and causes them to rotate together about their respective pivot pins 11.

The means used to actuate the arm are comprised of a pump driven by an electric motor. As fluid is pumped into the ram's cylinder through a first inlet port, its piston will be retracted causing the tag axle assembly 7 to be lifted from its ground engaging position (shown in solid lines in FIG. 1) to its elevated position (shown in dotted lines in FIG. 1). Subsequently, when fluid is pumped into a second inlet port of the ram 12, the piston will be forced out of the cylinder to cause the tag axle assembly 7 to pivot from the elevated position to the ground engaging position.

An important feature of the present invention is the location of the point about which the tag axle assembly 7 pivots with respect to the frame 2. To maximize the advantage of the design vis-a-vis governmental weight restrictions, the location of the pivot should be located low on the frame 2 and as close to the rear of the frame 2 as is conveniently possible. This increase the distance between axles and since axle spacing is a criteria determining the maximum load which can be transported, it also permits carrying increased payloads.

Other important features of the present invention relate to the location and orientation of collecting chute 5 and the discharge chute 6. In the preferred embodiment, the collecting chute 5 is fixedly attached to a pedestal 14 and retained in stationary position beneath the drip ring (not shown) surrounding the drum's outlet for receiving concrete discharged from the drum 4. Pedestal 14 rotationally supports the rearmost end of the drum 4.

Also attached to and projecting from support pedestal 14 is a pivot assemboy 15. The main distribution chute is attached to and supported by pivot assembly 15 via an appropriate linkage including upper linkage member 16 and a lower linkage member including a further hydraulic actuator 18. The pivot assembly 15 and linkage member 16 are secured to each other so as to permit rotational movement of the linkage 16 with respect to the pivot assembly 15. As linkage 16 rotates so will the main distribution chute 6.

With the design of the preferred embodiment, only if the distribution chute 6 is positioned so that its extends generally straight back from the truck can the tag axle assembly 7 be raised and lowered without contacting the chute 6. If chute 6 were to be pivoted either to the right or left as the tag axle assembly is raised or lowered, serious damage may result to the chute assembly, the tag axle assembly or both.

To ensure that chute 6 is pointing straight back during actuation of the tag axle assembly 7, there is a limit switch 20 mounted to the pivot assembly 15. Limit switch 20, which is opened or closed by rotation of the linkage 16 precludes operation of the motor used to drive the pump used to actuate the ram 12 to raise and lower the tag axle assembly 7 unless switch 20 is closed.

Figure 2:
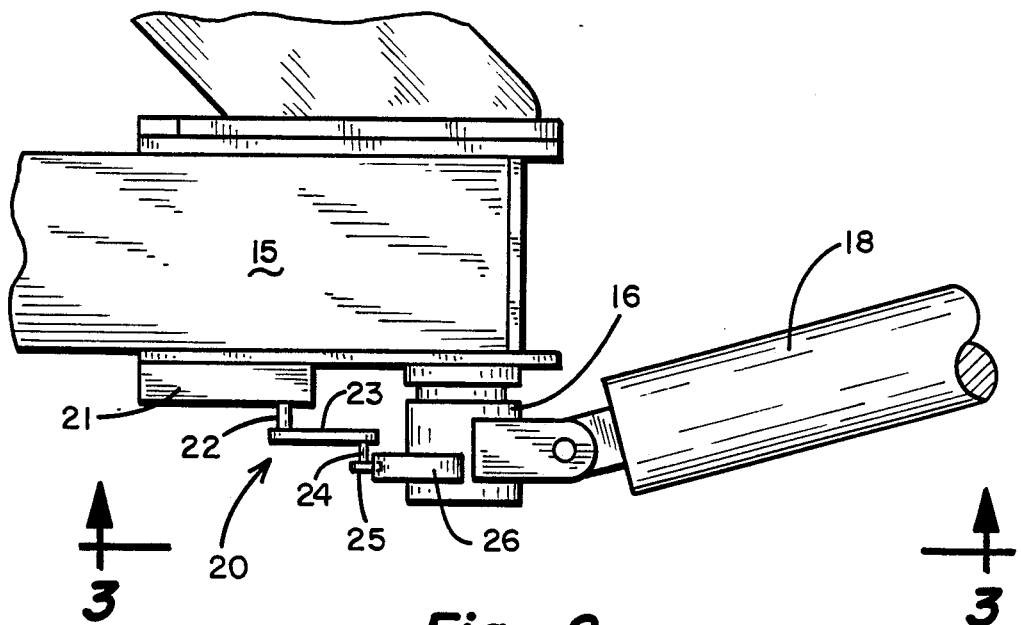
FIG. 2 is a side view showing more specifically the pedestal of the chute assembly and the limit switch associated therewith.
Figure 3:
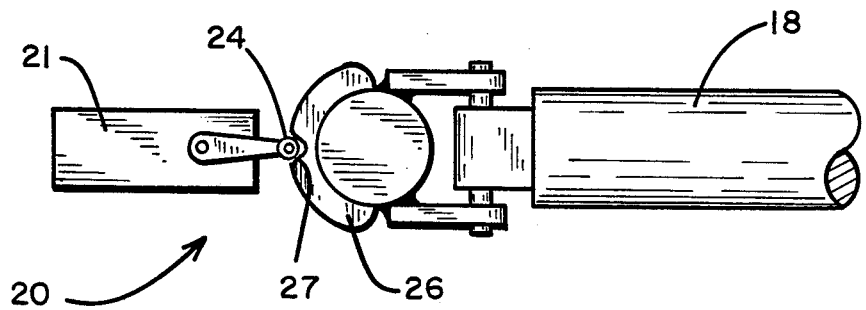
FIG. 3 is a top view showing the limit switch in its closed position and the pedestal.
Figure 4:
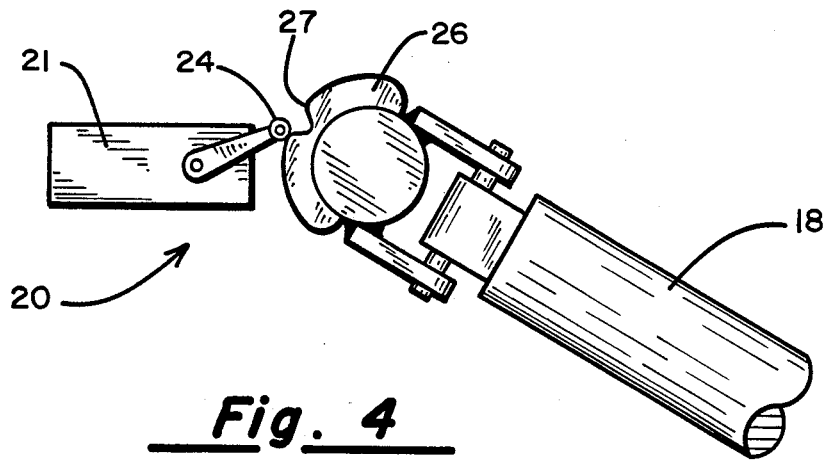
FIG. 4 is a top view showing the limit switch in its open position and the pedestal.

The mechanical configuration of limit switch 20, is best shown in FIGS. 2 through 4. Switch 20 includes a housing 21, a rotatable member 22 projecting from said housing, a toggle member 23 projecting at one end from the rotatable member 22 at a right angle, and a seating member 24 having a roller 25 projecting downwardly from the toggle member 23. Fixedly attached to the rotatable linkage 16 is a collar 26 which includes a notched seat 27. Rotation of the linkage 16 by movement of the distribution chute 6 causes the roller member 24 of the switch 20 to roll across the surface of the collar 26. The switch 20 remains open until the roller member 24 is received within the seat 27 of the collar 26 as shown in FIG. 3. Seating of the roller 24 causes the switch 20 to close. Given the alignment of the seat 27 and the delivery chute 6 with respect to the collar 26, the switch 20 is only closed when the chute 6 is straight back where it cannot interfere with movement of the tag axle assembly 7 as it is moved between its up and down position.

Figure 5:
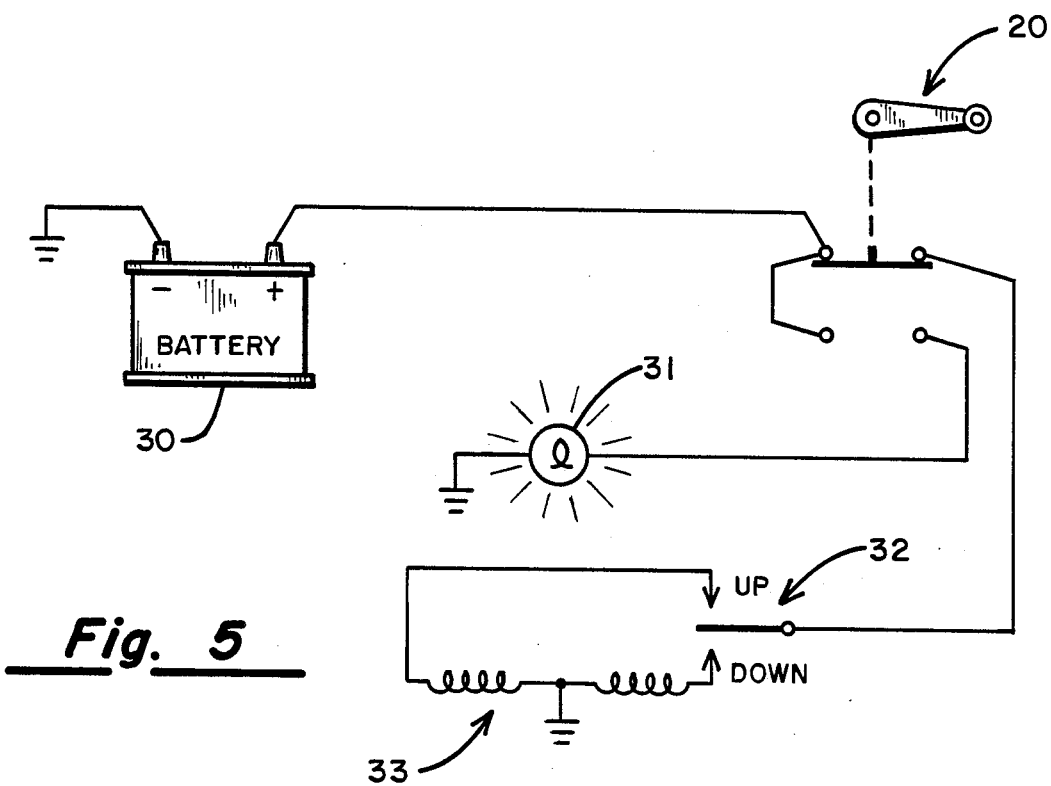
FIG. 5 shows the electrical circuit associated with the limit switch which precludes the tag axle assembly from raised or lowered except when the limit switch is closed.

FIG. 5 shows the electrical configuration of limit switch 20. Limit switch 20 is wired into the control circuit for the tag axle assembly so that the circuit is only capable of being energized when switch 20 is closed. In addition to the switch 20, the circuit includes a battery 30 and an indicator light 31 which is lighted only when the switch 20 is open. The circuit also includes a second single-pole, double-throw switch 32 having an up (closed) position, a center (open) position and a down (closed) position. If either switch 20 or switch 32 are open, the tag axle assembly cannot be actuated. If switch 20 is closed and switch 32 is in the up position, the circuit will be completed causing the motor/pump combination 33 to route fluid from the ram 12 causing the tag axle assembly 7 to move from its ground engaging position to its elevated position. Similarly, if the limit switch 20 is closed and switch 32 is in the down position, the motor 33 will drive the pump to route fluid into the ram 12 causing the tag axle assembly 7 to move from its elevated position to its ground engaging position.

While the foregoing is intended to fully disclose the subject invention, those skilled in the art will immediately recognize that changes can be made to the disclosed embodiment without deviating from the invention. Thus, the foregoing should not be read in any limiting sense. Instead, the scope of the invention should be determined in light of the claims.

What is claimed:

1. In a concrete mixing vehicle of the type having a frame, a mixing drum supported by said frame and a distribution chute mounted to a linkage which is rotatably mounted to said frame, an improved tag axle assembly including:
   (a) first and second support arms pivotally mounted to the frame;
   (b) wheel means journaled for rotation on said first and second support arms;
   (c) means for moving said first and second support arms in unison between a ground engaging position of said wheel means and an elevated position; and (d) limit means for precluding such movement of said first and second support arms except when said distribution chute is positioned so that it will not come into contact with said first and second support arms when they are moved, said limit means including a collar fixedly attached to said linkage and an electrical limit switch which is actuated by rotation of said collar.

2. The apparatus of claim 1 wherein said collar includes a seat and the limit switch includes a roller for engaging said collar so that the limit switch will only be closed when the roller is within the seat of the roller.

3. The apparatus of claim 2 wherein said distribution chute, collar and seat are aligned such that when the roller of the limit switch is within the seat, the distribution chute is in a position which is not in the path of travel of the tag axle assembly as it moves between its ground engaging position and its elevated position.

4. The apparatus of claim 3, further including an indicator light for signalling when the limit switch is open.

5. The apparatus of claim 1 wherein said first and second support arms are pivotally mounted to the lowermost, rearward most portion of said frame.

* * * * *